United States Patent

Eikmeier et al.

(10) Patent No.: US 7,087,278 B2
(45) Date of Patent: Aug. 8, 2006

(54) ADHESIVE TAPE FOR A CONTINUOUS ROLL CHANGE

(75) Inventors: Markus Eikmeier, Hamburg (DE); Thomas Gassner, Heldgraben (DE); Christoph Nagel, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 118 days.

(21) Appl. No.: 10/432,693

(22) PCT Filed: Nov. 8, 2001

(86) PCT No.: PCT/EP01/12919

§ 371 (c)(1),
(2), (4) Date: Dec. 18, 2003

(87) PCT Pub. No.: WO02/44062

PCT Pub. Date: Jun. 6, 2002

(65) Prior Publication Data

US 2004/0115403 A1 Jun. 17, 2004

(30) Foreign Application Priority Data

Nov. 28, 2000 (DE) .............................. 100 58 956

(51) Int. Cl.
*B32B 3/02* (2006.01)
(52) U.S. Cl. .................. 428/40.1; 428/77; 428/192; 428/354; 428/350; 156/157; 156/504; 242/555; 242/556.1
(58) Field of Classification Search .................. 428/192, 428/77, 40.1, 343, 354, 350; 156/157, 504; 242/555, 556.1
See application file for complete search history.

(56) References Cited

U.S. PATENT DOCUMENTS

| | | | |
|---|---|---|---|
| 5,212,002 A | 5/1993 | Madrzak et al. | 428/40 |
| 5,702,555 A | 12/1997 | Caudal et al. | 156/247 |
| 5,901,919 A | 5/1999 | Wienberg | 242/556.1 |
| 5,916,651 A | 6/1999 | Wienberg et al. | 428/40.1 |
| 6,416,604 B1 | 7/2002 | Nootbaar et al. | 156/157 |
| 6,503,618 B1 | 1/2003 | Jakobi et al. | 428/343 |

FOREIGN PATENT DOCUMENTS

| | | |
|---|---|---|
| DE | 40 33 900 A1 | 10/1991 |
| DE | 43 18 277 C1 | 9/1994 |
| DE | 196 28 317 A1 | 1/1998 |
| DE | 196 32 689 A1 | 2/1998 |
| DE | 198 30 673 A1 | 1/2000 |
| DE | 198 30 674 A1 | 1/2000 |
| DE | 198 41 609 A1 | 3/2000 |
| DE | 199 02 179 A1 | 8/2000 |
| EP | 0 418 527 A2 | 3/1991 |

*Primary Examiner*—Alexander S. Thomas
(74) *Attorney, Agent, or Firm*—Norris McLaughlin & Marcus PA

(57) ABSTRACT

An adhesive tape for flying splice, having
a) two long edges (14, 16) of a top side and of a bottom side,
b) a cleavable backing system (7),
c) a self-adhesive composition (8) on the top side of the cleavable backing (7) and
d) a self-adhesive composition (9) on the bottom side of the cleavable backing (7),
characterized in that
e) at least the one of the long edges (14) at which the cleaving of the cleavable backing (7) begins during flying splice (front edge) exhibits a jagged cut (15).

18 Claims, 2 Drawing Sheets

ADHESIVE TAPE FOR A CONTINUOUS ROLL CHANGE

This is a 371 of PCT/EP01/12919 filed 8 Nov. 2001 (international filing date).

The invention relates to an adhesive tape for flying roll change and also to a splice method using such an adhesive tape, especially in paper enhancement machines, printing machines, and the like.

BACKGROUND OF THE INVENTION

Flying roll change (flying splice) in paper mills or the like is a common technique for replacing an old, almost fully unwound roll of paper by a new roll without having to stop the machines, which run at high speed. This is done using double-sided self-adhesive tapes, so-called tabs, which on the one hand are highly adhesive and highly tacky but on the other hand, owing to their water-soluble self-adhesive compositions and paper backings, do not cause disruption in the paper machine when the paper wastes are reused. These tabs are bonded in complicated bonding patterns to the start of the web, a procedure requiring experienced personnel, with little time remaining for the entire procedure owing to the increasing speeds of the machines.

Although this technology is well established, it is not without certain disadvantages. Thus, experienced personnel are required, the procedure is intrinsically hectic, and the bonds are also relatively thick: the maximum total thickness of the bond originates from two paper plies and the tear adhesive tape in between, plus any fixing labels. It is a concern on the part of the paper industry to reduce this bond thickness to a minimum.

For traditional methods of bonding in flying splice there are various products on the market, called tabs, which in addition to a paper backing feature a water-soluble self-adhesive composition coated on both sides. Adhesive tapes of this kind are on the market, inter alia, under the name tesafix (Beiersdorf).

The prior art describes diverse adhesive tapes for such purposes. For instance, EP 418 527 A2 discloses a method of preparing a roll of printing material in web form for automatic roll changes and an adhesive strip suitable for that method. DE 40 33 900 A1 also describes an adhesive tape suitable for a splice site. A disadvantage, however, are adhesive regions which lie exposed after the splice method has been implemented.

The nonadhesive masking of otherwise exposed adhesive areas is taught by U.S. Pat. No. 5,702,555 for more static loadings of a securement of a roll start, while DE 196 32 689 A2 discloses an adhesive tape of this kind for dynamic loading during the splicing process, the paper backing of said tape cleaving and masking the adhesives with its residues.

Also of this kind is an adhesive tape according to DE 196 28 317 A1, likewise for a splicing method. This adhesive tape carries, on its nonadhesive reverse face, a double-sided adhesive tape (6) which has a readily cleaving paper backing (7) which cleaves (7a, 7b, FIG. 3) during the splicing method and masks the respective adhesives. This double-sided adhesive tape (6) ends at the side with one side of the paper backing (2); it is, therefore, arranged along one of the long edges of the adhesive tape.

DE 199 02 179 A1 also discloses an adhesive tape for this application, where, in order to avoid breaks during flying splice, an adhesive tape laminated on with paper backing (P2) of cleavable paper is disposed with an inset, specifically at a certain distance (V) from the long edge (LK) of the adhesive tape.

In practise, even these adhesive tapes exhibit disadvantages, primarily because a flying splice is unsuccessful and instead ends as a break, without any evident reason for this.

It was an object of the invention to provide a remedy here.

This object is achieved by an adhesive tape for flying splice, comprising a) a first backing having a top side, a bottom side and two long edges, with a water-soluble self-adhesive coating on the top side, b) a double-sided adhesive tape, having a cleavable paper backing with two long edges and coated on both sides with a water-soluble self-adhesive composition, adhesively bonded to the bottom side of said first backing, wherein, c) at least one of said two long edges of said double-sided adhesive tape has a jagged cut.

Admittedly, jagged cutting as such is known and is employed in particular in order to provide products equipped accordingly with hand tearability. Such as in the case of textiles or in the case of adhesive tapes; cf. DE 43 18 277 C1. This property of the easier tearability by hand would, however, have necessarily led right away from the inventive use of a jagged cut, since at the high speeds and high forces which occur during flying splice unwanted and possibly premature breaks would have to be considered likely, particularly since DE 199 02 179 A1 expressly recommends "clean cut edges" (p. 2, line 54).

However, it has been found that a flying splice with the adhesive tapes of the invention is more reliable on account of the very low initial cleaving force at the tip of the jag and the force which increases continuously as the area of the jag increases. Breaks, accordingly, are effectively prevented.

The cleavable paper advantageously has a significantly lower cleavage resistance than a paper backing, which has to absorb tensile forces.

Suitable cleavable backings (or cleavable systems), in particular as cleavable papers, include for example the following papers or paper composite systems:

Duplex papers: these papers are standard commercial products and are used, for example, in the production of filter materials and wall coverings.

Readily cleaving papers: the cleavage energy is adjusted by way of the consolidation of the paper fiber structure. The lower the consolidation, the lower the cleavability.

Additionally suitable paper systems include, for example, machine-finished papers calendered on one side or else highly filled kraft papers.

sized paper systems: the cleavability is adjusted by way of the chemistry of the adhesive size. The size ought not to have penetrated substantially into the paper.

It is also possible to use a cleaving system in accordance with DE 198 41 609 A1.

The amount by which the cleavable material is set in, or the distance from the long edge, should be about 0.5 to 15 mm, in particular 1–7 mm, and very particularly 1.5 mm–3.5 mm.

A variety of cleavable paper systems are suitable as the cleavable paper, such as Duplex papers (papers laminated together in a defined manner; the process of cleavage proceeds extremely homogeneously, with no stress peaks produced as a result, for example, of inhomogeneous consolidation. These papers are used for the production of wall coverings and filters.

Readily cleavable paper systems

Highly consolidated papers sized together in a defined way (→paper with a high cleavage strength). Sizing may be carried out, for example, using starch, starch-containing derivatives, wallpaper pastes based on methylcellulose (Methylan®, Henkel KGaA, Düsseldorf) or else based on polyvinyl alcohol derivatives.

The width of the backing of cleavable paper is preferably 3–20 mm, especially 6–12 mm.

Suitable self-adhesive compositions include all basic types of pressure-sensitive adhesive, particularly Acrylates (water-soluble and water-insoluble)

Natural rubber compositions, synthetic rubber compositions and dispersions thereof The splice method, in this case the bonding operation using the splicing tape, may in particular take place in such a way that the adhesive tape is bonded to the running web at right angles.

The drawings show a diagram of an adhesive tape of the invention and its use and is therefore intended to illustrate the invention by way of example.

On cleavage strength and its measurement, refer to DE 199 02 179 A1, also with regard to the materials which can be used, especially papers and adhesives.

Generally, the cleavage strength of the cleavable backing is from 20 to 70 cN/cm. In a particular embodiment the cleavage strength is 22 to 60 cM/cm.

Also suitable are embodiments as described in DE 198 30 674, DE 198 30 673 and DE 196 28 317 A1, but also in accordance with DE 196 32 689. Those documents are therefore expressly incorporated by reference. Particular preference, however, is given to an embodiment according to DE 199 02 179 A1.

The purpose of the text below is to describe the invention in more detail with reference to an example, but without wishing to subject it to any unnecessary restriction as a result.

DETAILED DESCRIPTION

Figure 1A:
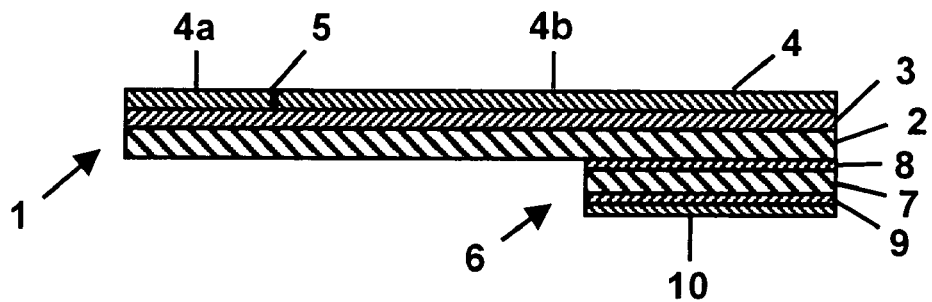
FIG. 1a shows a diagrammatic side elevation of an adhesive tape of the invention.
Figure 1B:
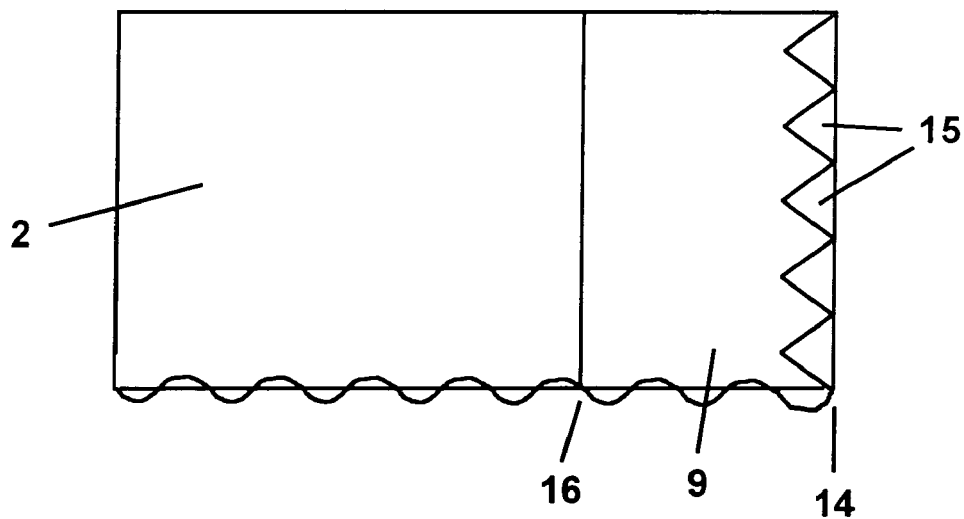
FIG. 1b shows a plan view of an adhesive tape according to FIG. 1a, from below.

Specifically, FIGS. 1a and 1b show an adhesive tape 1 having a backing 2 of lightly creped paper, coated on one side with a water-soluble self-adhesive composition 3. The overall thickness of the backing 2 with self-adhesive composition 3 is 0.088 mm, its width is 150 mm, and it is sold as tesakrepp 51447 Beiersdorf, Germany. The self-adhesive composition 3 is lined with a siliconized release paper 4, which is provided at a distance of 30 mm from its left-hand edge with a slit 5, so that the left-hand portion of the release paper 4 may be removed first of all and then the right-hand portion. At the right-hand end of the adhesive tape 1 a double-sided adhesive tape 6 is bonded underneath, consisting of a backing 7 made of cleavable paper, coated on both sides with water-soluble self-adhesive composition 8 and 9 respectively. The adhesive tape 6 has a width of 9 mm. The self-adhesive composition 9 carries a release paper 10.

The right-hand long edge 14 (during splicing, the front edge, where the cleaving of the paper backing 7 begins) exhibits a jagged cut 15, while the left-hand long edge 16 is cut smoothly. Concerning the jagged cut 15 and the cutters used to make it, refer to DE 43 18 277 C1. In accordance with the invention, specifically, an exemplary jag height of 0.5 mm was chosen, the tip angle being 90°.

Figure 2:
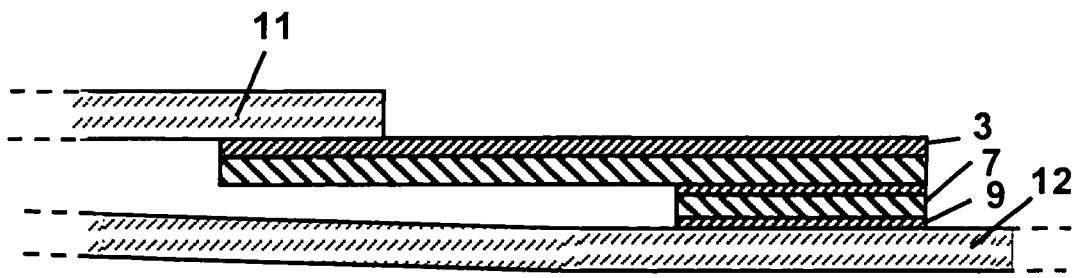
FIG. 2 shows a diagrammatic side elevation of an adhesive tape according to FIG. 1, adhered to a roll of paper and ready for a flying splice.

FIG. 2 shows how an adhesive tape 1 of this kind is stuck behind a paper web 11, namely by its left-hand portion, after the portion of the release paper 4a has been removed from said left-hand portion. Beforehand, the adhesive tape was bonded by its exposed self-adhesive composition 9 to the paper web 12 of a roll of paper, which lies beneath the paper web 11. The right-hand portion 4b of the release paper 4 has also been removed, so that the roll of paper thus equipped is ready for a flying splice, the bond of the adhesive tape 1 running at right angles over the roll.

The self-adhesive composition 3 is now exposed and constitutes the area of contact with the outgoing web for the flying splice. The area of contact has a width of 120 mm and extends over the entire width of the roll of paper.

Figure 3:
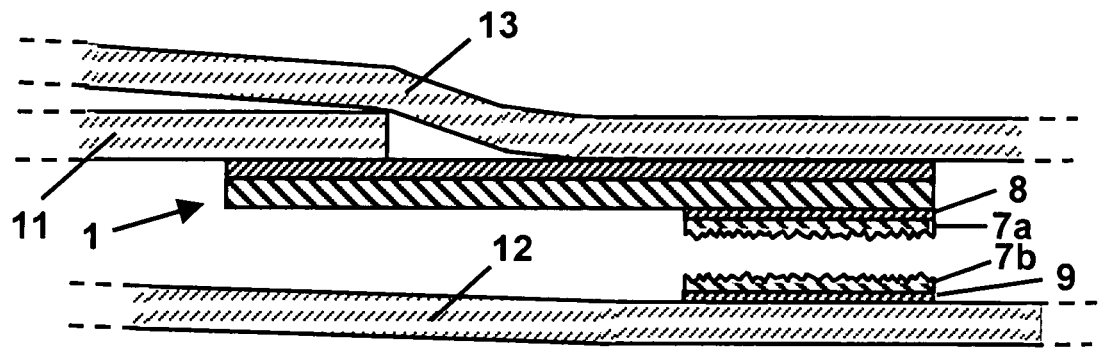
FIG. 3 shows a view in accordance with FIG. 2 but after flying splice has taken place.

The (new) roll of paper thus equipped is placed adjacent to the unwound (old) roll of paper to which the new roll is to be attached. The new roll of paper is accelerated to a rotational speed which corresponds virtually to the speed of the outgoing web. When the two speeds have been sufficiently synchronized, the splice can be completed: the outgoing web is brought into contact with the periphery of the new roll by means of a contact pressure shaft, and the self-adhesive composition 3 sticks in accordance with FIG. 3 to the outgoing paper web 13. Instantaneously after adhesive contact, the readily cleaving paper backing 7 cleaves in such a way that one portion 7a remains on the adhesive tape 1, where it covers the self-adhesive composition 8, while the other portion 7b remains on the self-adhesive composition 9 which sticks to the paper web 12. Accordingly, both self-adhesive composition 8 and 9 have been neutralized, so to speak, no longer adhere, and thus do not disrupt the subsequent operation in the paper-processing machines.

Figure 4:
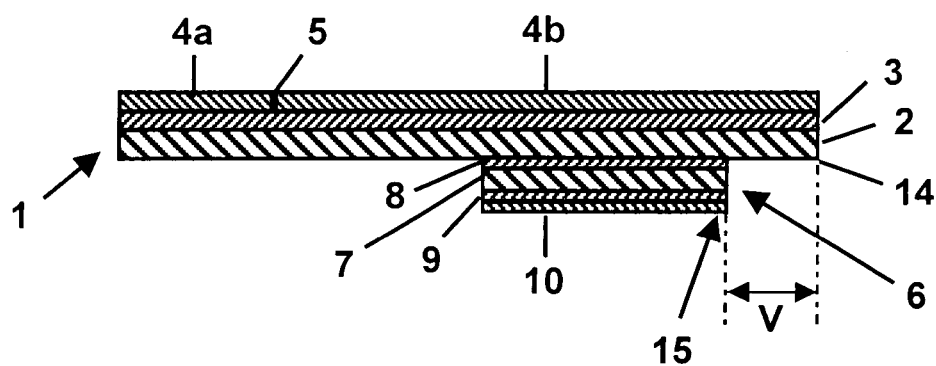
FIG. 4 shows a diagrammatic side elevation of a further, third embodiment of an adhesive tape of the invention.

FIG. 4 shows an adhesive tape 1 similar to that of FIG. 1; refer to all reference numerals there, although the paper backing 7 with self-adhesive composition 8 and 9 respectively with release paper 10 (adhesive tape 6 overall) is arranged with an inset from the long edge by 14 mm, the distance V, but also, as in accordance with FIG. 1, has a jagged cut 15.

We claim:

1. An adhesive tape for flying splice, comprising
   a) a first backing having a top side, a bottom side and two long edges, with a water-soluble self-adhesive coating on the top side,
   b) a double-sided adhesive tape, having a cleavable paper backing with two long edges and coated on both sides with a water-soluble self-adhesive composition, adhesively bonded to the bottom side of said first backing, wherein,
   c) at least one of said two long edges of said double-sided adhesive tape has a jagged cut.

2. The adhesive tape of claim 1, wherein the jagged cut has a jag having a height of 0.3–20 mm.

3. The adhesive tape of claim 2, wherein said jag height is 0.4–5 mm.

4. The adhesive tape of claim 3, wherein said jag height is 0.5 mm.

5. The adhesive tape of claim 1, wherein the jag includes a tip angle providing a jagged cut of 80–100°.

6. The adhesive tape of claim 5, wherein said tip angle is 90°.

7. The adhesive tape of claim 1, wherein the first backing and the adhesive composition disposed on the top side of the first backing are wider than the double-sided adhesive tape having the cleavable paper backing and overhangs the double-sided adhesive tape by 0.5–15 mm.

8. The adhesive tape of claim 7, wherein said overhang is 1–7 mm.

9. The adhesive tape of claim 8, wherein said overhang is 1.5–3.5 mm.

10. The adhesive tape of claim 7, wherein the first backing and the adhesive composition disposed on the topside of the first backing are at least 2 times as wide as the double-sided adhesive tape with the cleavable backing.

11. The adhesive tape of claim 7, wherein the backing is a paper backing or film backing of high tensile strength.

12. The adhesive tape of claim 7, wherein the self-adhesive compositions are selected from the group consisting of water-soluble acrylate adhesives, natural rubber, synthetic rubber and dispersions thereof.

13. The adhesive tape of claim 7, wherein said self-adhesive composition coated on the top side of the first backing is provided with a liner, which optionally has a perforation or a slit in the lengthwise direction, parallel to the long edges.

14. The adhesive tape of claim 1, wherein the cleavage strength of the cleavable paper backing is from 20 to 70 cN/cm.

15. The adhesive tape of claim 14, wherein said cleavage strength is 22 to 60 cN/cm.

16. A splice method wherein the top side of an adhesive tape of claim 1 is bonded partly behind the topmost web of a roll of web material, while the bottom side of the adhesive tape bonds to the web underlying the topmost web and thus secures the topmost web, and said top side of said adhesive tape is optionally provided with a liner which is only partially removed, whereby only a portion of the self-adhesive composition of the top side of said adhesive tape, which is required for the splice method, remains covered with liner and the roll in this state has no exposed adhesive area, whereupon any remaining liner is removed for the final preparation for the splice method, whereupon the new roll thus equipped is placed adjacent to a substantially completely unwound old roll of web material to be replaced, and is accelerated to the same rotational speed as the latter, then is pressed against the old web, the exposed self-adhesive composition of the adhesive tape bonding to the web on the old roll with the speeds of the webs being substantially the same, while at the same time the cleavable backing made of cleavable material cleaves and, with its residues, nonadhesively covers both of the self-adhesive compositions with which it was coated.

17. The splice method of claim 16, wherein the adhesive tape is bonded at right angles to the running web.

18. The splice method of claim 16, wherein said web material is paper.

* * * * *